(12) United States Patent
Matsubara (10) Patent No.: US 8,608,235 B2
(45) Date of Patent: Dec. 17, 2013

(54) VEHICLE BODY STRUCTURE

(75) Inventor: Takehide Matsubara, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/697,114

(22) PCT Filed: Apr. 28, 2011

(86) PCT No.: PCT/JP2011/060451
§ 371 (c)(1),
(2), (4) Date: Nov. 9, 2012

(87) PCT Pub. No.: WO2011/142281
PCT Pub. Date: Nov. 17, 2011

(65) Prior Publication Data
US 2013/0057027 A1  Mar. 7, 2013

(30) Foreign Application Priority Data

May 11, 2010 (JP) .................................. 2010-108913

(51) Int. Cl.
*B62D 25/08* (2006.01)
(52) U.S. Cl.
USPC ........................................................ 296/192
(58) Field of Classification Search
USPC ........................................................ 296/192
See application file for complete search history.

(56) References Cited

U.S. PATENT DOCUMENTS

| | | | |
|---|---|---|---|
| 4,750,780 A * | 6/1988 | Harasaki et al. | 296/192 |
| 7,004,534 B2 * | 2/2006 | Yoshii et al. | 296/192 |
| 7,540,557 B2 | 6/2009 | Shimura | |
| 2008/0116721 A1 * | 5/2008 | Shimura | 296/192 |

FOREIGN PATENT DOCUMENTS

| | | |
|---|---|---|
| JP | 4-16088 U | 2/1992 |
| JP | 5-4669 U | 6/1993 |
| JP | 2003-191750 A | 7/2003 |
| JP | 2006-206004 A | 8/2006 |
| JP | 2007-331720 A | 12/2007 |
| JP | 2009-83745 A | 4/2009 |

* cited by examiner

*Primary Examiner* — Lori Lyjak
(74) *Attorney, Agent, or Firm* — Foley & Lardner LLP (57) ABSTRACT

Disclosed is a vehicle body structure of an automobile in which a front edge portion of a front windshield glass is supported by an air box including a vertical wall surface portion facing an inner side of a vehicle compartment. In the vehicle structure, the front edge portion of the glass is connected to the air box in such a way that when glass membrane vibrations of the glass in surface inward-outward directions are in a phase shifting in an inward direction to the vehicle compartment, the vertical wall surface portion of the air box shifts in an outward direction from the vehicle compartment, and when the glass membrane vibrations of the glass in the surface inward-outward directions are in a phase shifting in an outward direction from the vehicle compartment, the vertical wall surface portion of the air box shifts in an inward direction to the vehicle compartment.

3 Claims, 6 Drawing Sheets

VEHICLE BODY STRUCTURE

TECHNICAL FIELD

The present invention relates to a vehicle body structure of an automobile capable of providing an excellent noise vibration performance.

BACKGROUND ART

Japanese Patent Application Publication No. 2009-83745 discloses a vehicle body structure of an automobile in which a front edge portion of a front windshield glass is connected to an upper surface of a cowl panel member. In this vehicle body structure, a front edge portion of the cowl panel member is provided to extend toward the front of the vehicle to a position above an air box, on an engine room rear wall side, the air box having a vertical wall surface portion which faces an inner side of a vehicle compartment and extends in a vehicle width direction. In addition, the front edge portion of the front windshield glass is placed on an upper surface side of the front edge portion of the cowl panel member, and a lower surface side of the front edge portion of the front windshield glass is connected to the front edge portion of the cowl panel member. Thus, the front windshield glass is supported from below.

SUMMARY OF INVENTION

Technical Problem

However, in the above vehicle body structure, a portion of the air box which supports the front windshield glass has a cantilever structure. For this reason, when glass membrane vibrations occur, the amplitude of the vibrations increases easily. This changes the capacity of the vehicle compartment largely and increases muffled sound, making passengers in the vehicle compartment feel uncomfortable. In order to avoid this, it has been necessary to increase the supporting rigidity by, for example, increasing a plate thickness of a portion for supporting the front windshield glass.

An object of the present invention is to provide a vehicle body structure of an automobile capable of suppressing changes in capacity of a vehicle compartment and improving a noise vibration performance.

Solution to Problem

One aspect of the present invention is a vehicle body structure of an automobile in which a front edge portion of a front windshield glass is supported by an air box including a vertical wall surface portion facing an inner side of a vehicle compartment. In the vehicle structure, the front edge portion of the glass is connected to the air box in such a way that when glass membrane vibrations of the glass in surface inward-outward directions are in a phase shifting in an inward direction to the vehicle compartment, the vertical wall surface portion of the air box shifts in an outward direction from the vehicle compartment, and when the glass membrane vibrations of the glass in the surface inward-outward directions are in a phase shifting in an outward direction from the vehicle compartment, the vertical wall surface portion of the air box shifts in an inward direction to the vehicle compartment.

DESCRIPTION OF EMBODIMENTS

A vehicle body structure of an automobile 1 according to an embodiment of the present invention will be described below with reference to FIGS. 1 to 6.

Figure 2:
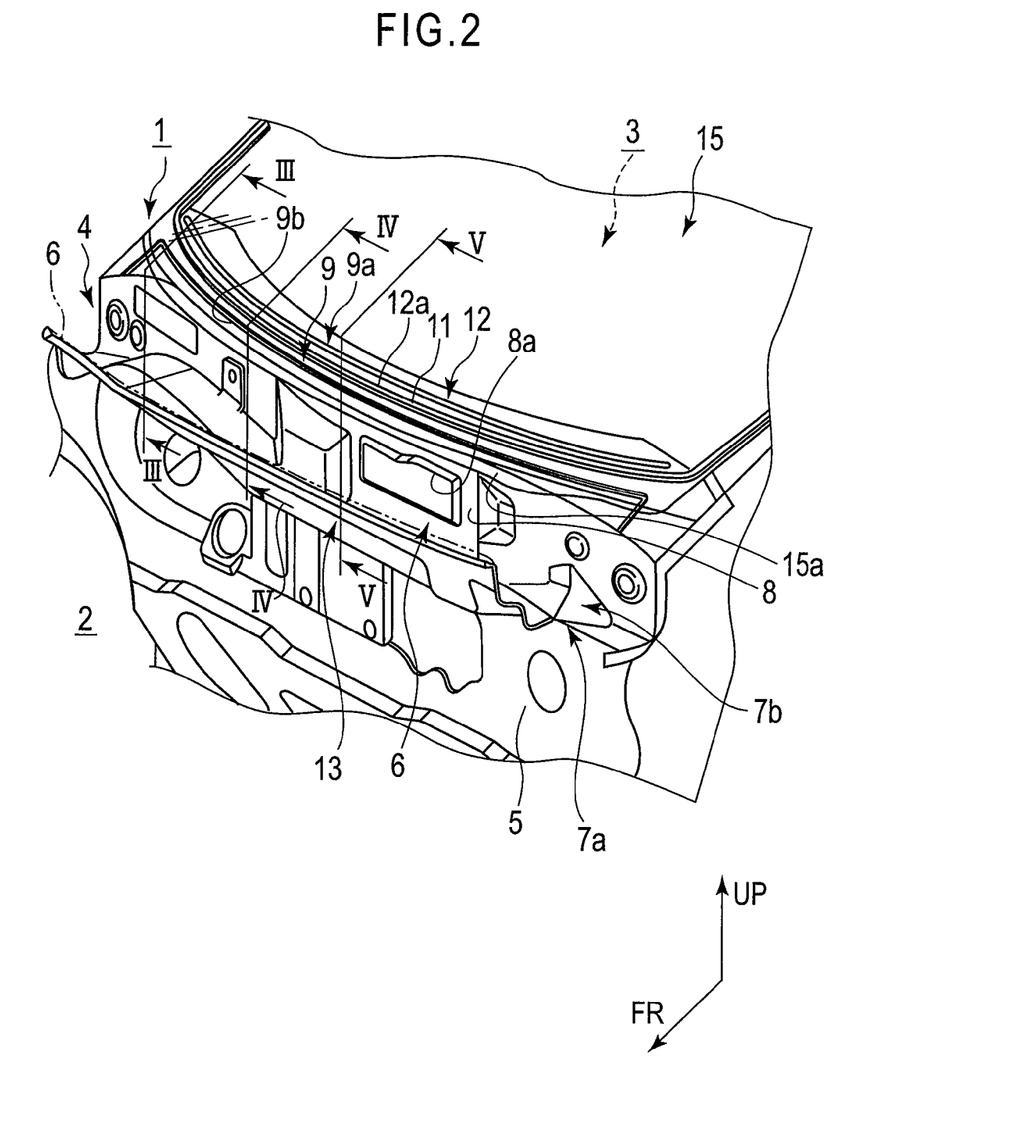
FIG. 2 is an exploded perspective view for explaining an overall configuration of the vehicle body structure in FIG. 1, and shows a region near the air box with the cowl top member removed.
Figure 3:
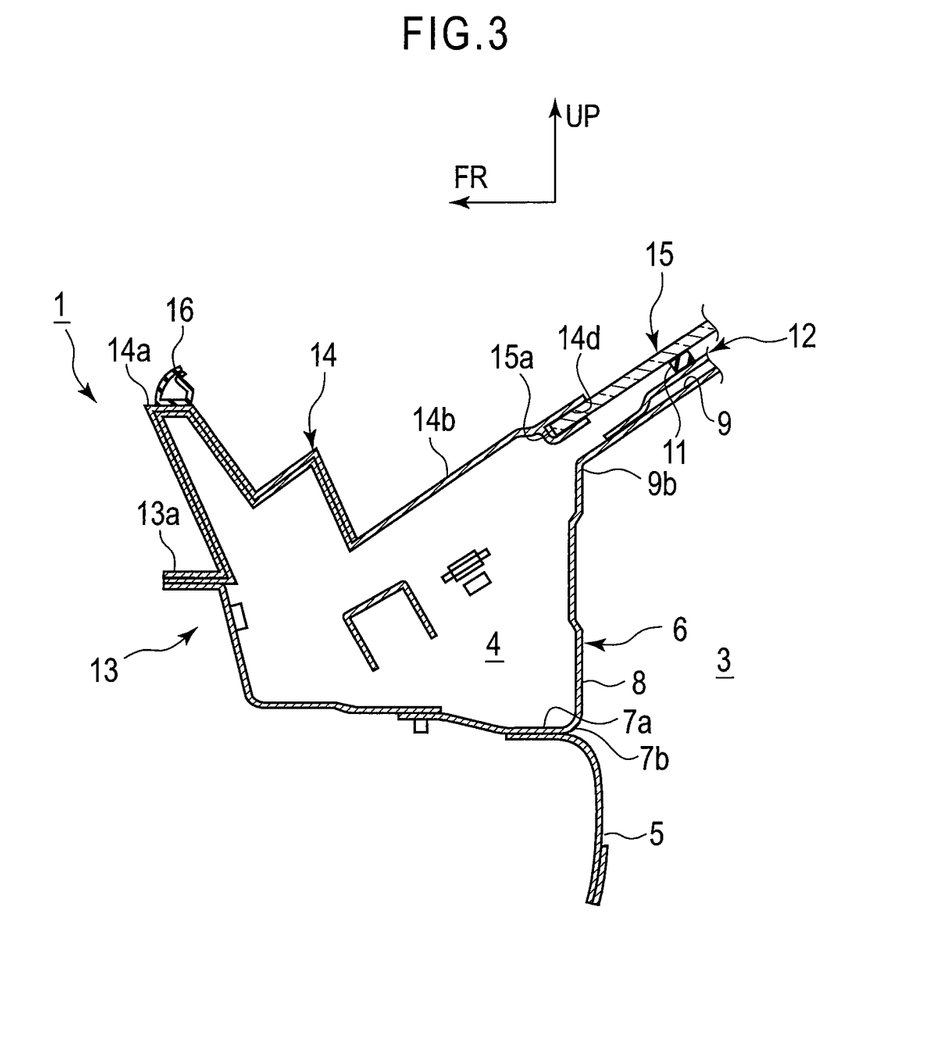
FIG. 3 is a cross-sectional view taken along the line of FIG. 2.
Figure 4:
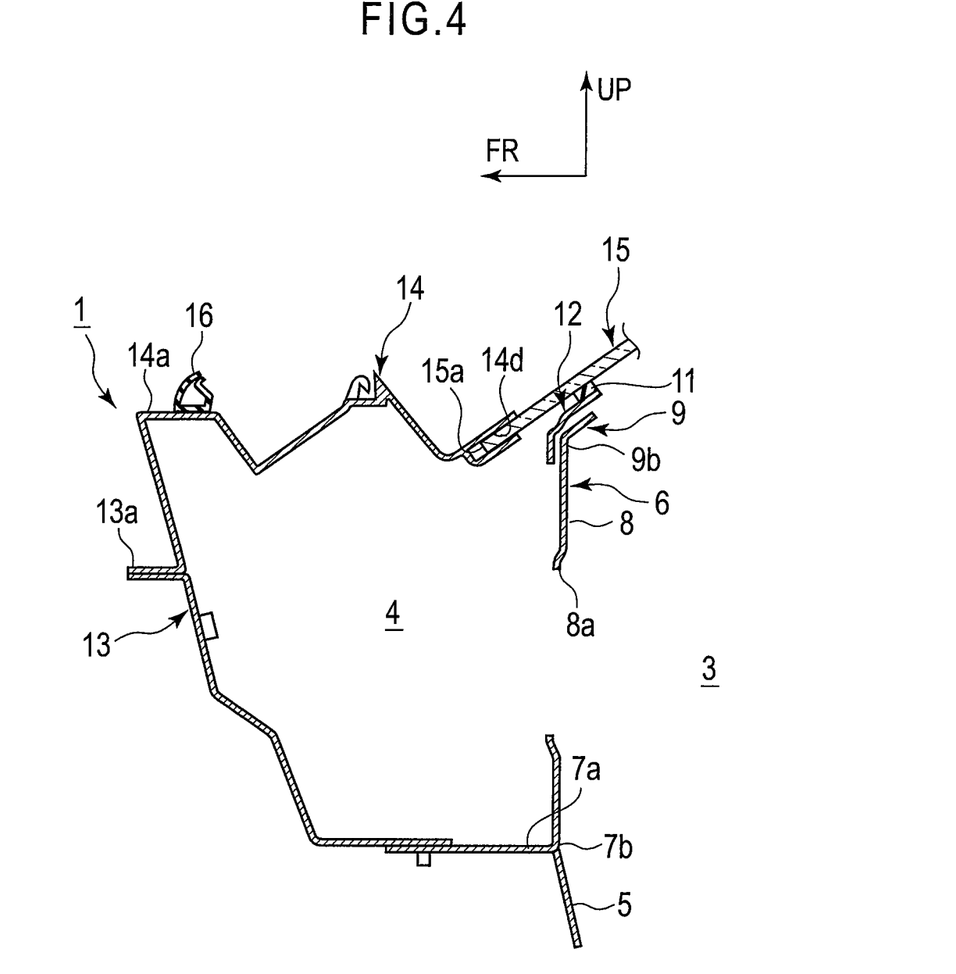
FIG. 4 is a cross-sectional view taken along the line IV-IV of FIG. 2.
Figure 5:
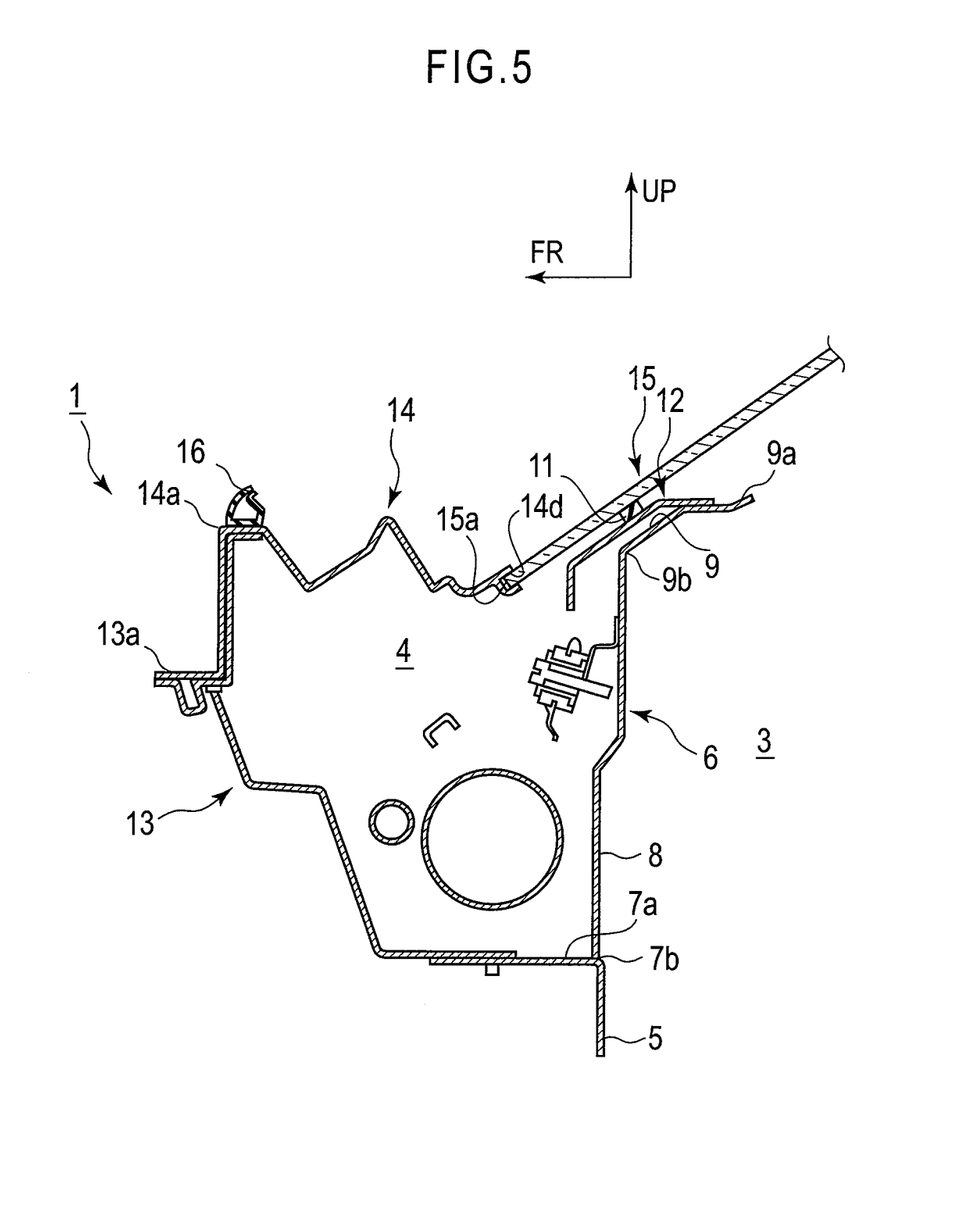
FIG. 5 is a cross-sectional view taken along the line V-V of FIG. 2.

As shown in FIG. 2, in a front portion of the automobile 1, an air box 4 is provided between an engine room 2 in which an engine, a motor or the like is provided as a driving source of the automobile 1 and a passenger compartment 3 which serves as a vehicle compartment for accommodating passengers. The air box 4 extends in a vehicle width direction, and has a substantially rectangular closed section in a vertical cross section (a cross section perpendicular to the vehicle width direction).

Figure 1:
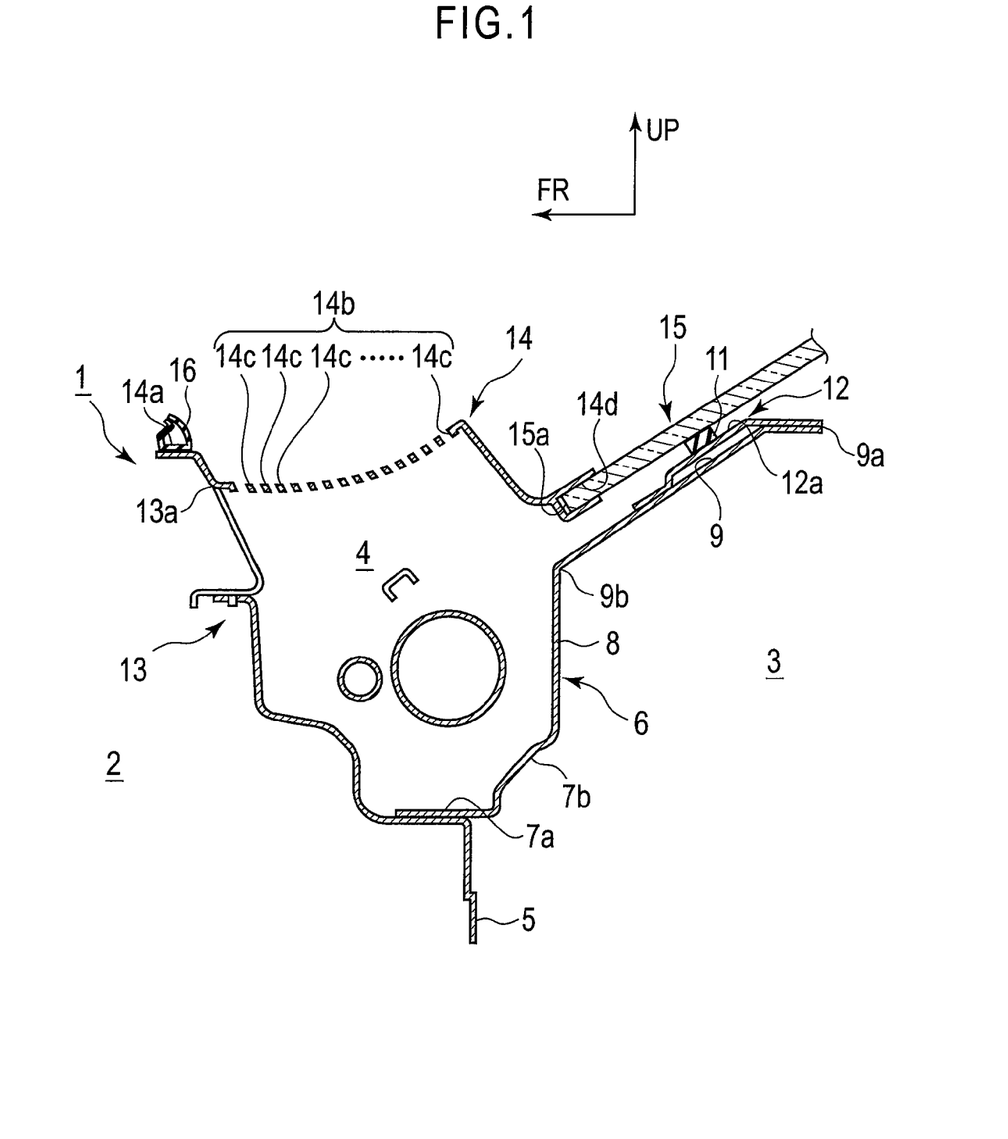
FIG. 1 shows a vehicle body structure of an automobile according to an embodiment of the present invention, and is a cross-sectional view of an air box and a cowl top member which is taken along a plane perpendicular to a vehicle width direction.

A lateral surface of the air box 4 on a side close to the inner side of the passenger compartment 3 includes a dash upper panel member 6. The dash upper panel member 6 includes, in the vertical cross section: a substantially horizontal connection portion 7a to be connected to a dash lower panel member 5; a rising portion 7b formed to be bent at a rear end of the connection portion 7a; and a vertical wall surface portion 8 provided to extend substantially vertically from a rear end of the rising portion 7b toward the top of the vehicle and to face an inner space of the passenger compartment 3. The dash upper panel member 6 and the dash lower panel member 5 are connected together at the connection portion 7a in such a way that the vertical wall surface portion 8 and the dash lower panel member 5 are substantially flush with each other. As shown in FIG. 1, the rising portion 7b may be formed to be bent to obliquely extend upward and rearward in the vehicle from the rear end of the connection portion 7a.

An air-conditioning opening 8a is formed in a substantially center portion of the vertical wall surface portion 8 in the vehicle width direction.

In addition, in the dash upper panel member 6, an upper inclined bearing surface portion 9 obliquely extending upward and rearward in the vehicle is integrally formed from an upper end of the vertical wall surface portion 8 to an upper edge portion 9a of the dash upper panel member 6, through a corner portion 9b formed to be bent to have a substantially obtuse-angled L shape in the vertical cross section.

As shown in FIG. 1, a cowl top cover bracket member 12 is fixedly provided on an upper surface of the upper inclined bearing surface portion 9.

A seal member 11 serving as a supporting portion is attached to an upper surface 12a of the cowl top cover bracket member 12. The seal member 11 has its longitudinal direction along the vehicle width direction and extends substantially over the entire length of the air box 4 in the vehicle width direction.

Additionally, a lateral surface of the air box 4 on the engine room 2 side is formed of an extension panel member 13 extending toward the front of the vehicle from the connection portion 7a of the dash upper panel member 6.

A front end edge 14a of a cowl top cover member 14 is locked to a front-edge-portion upper surface 13a of the extension panel member 13. The cowl top cover member 14 is mounted to substantially cover an upper-side opening of the air box 4, and forms an upper-side lateral surface of the air box 4.

On an upper surface of the front end edge 14a of the cowl top cover member 14, an elastic contact piece member 16 which a back surface of an engine hood (not illustrated) near an rear edge portion thereof is to be brought into contact with is provided to extend with the longitudinal direction thereof along the vehicle width direction.

In addition, in the cowl top cover member 14, an outside-air introduction surface portion 14b including multiple ventilation holes 14c ... is formed curvedly in a concave shape (in a convex shape protruding downward).

Moreover, at a rear end edge of the cowl top cover member 14, a glass fitting portion 14d is integrally formed in a concave shape to be fitted with a front edge portion 15a of a front windshield glass (hereinafter, also simply referred to as a glass) 15.

A substantially rectangular closed section of the air box 4 is formed of: the connection portion 7a, the rising portion 7b, and the vertical wall surface portion 8 of the dash upper panel member 6; the extension panel member 13; and the cowl top cover member 14.

In the embodiment, a position where the front edge portion 15a of the glass 15 is fitted to and supported by the glass fitting portion 14d is located immediately above the vertical wall surface portion 8 facing the inner side of the passenger compartment 3, and is located on a vehicle rear side of a position where the shape of cross section of the air box 4 is formed. In other words, a connection portion between the front edge portion 15a of the glass 15 and the cowl top cover member 14 is located above the vertical wall surface portion 8, on the vehicle rear side of the members forming the substantially rectangular closed section of the air box 4.

In addition, the front edge portion 15a of the glass 15 in the embodiment is supported at the position on the vehicle rear side of the vertical wall surface portion 8. To be more specific, the back surface side of the glass 15 near the front edge portion 15a is supported, by means of the seal member 11 attached to the upper surface 12a of the cowl top cover bracket member 12, from below at the position on the vehicle rear side of the vertical wall surface portion 8.

Moreover, the front edge portion 15a of the glass 15 is connected to the upper inclined bearing surface portion 9, through the seal member 11 and the cowl top cover bracket member 12, at the position on the vehicle rear side of in the air box 4.

Figure 6:
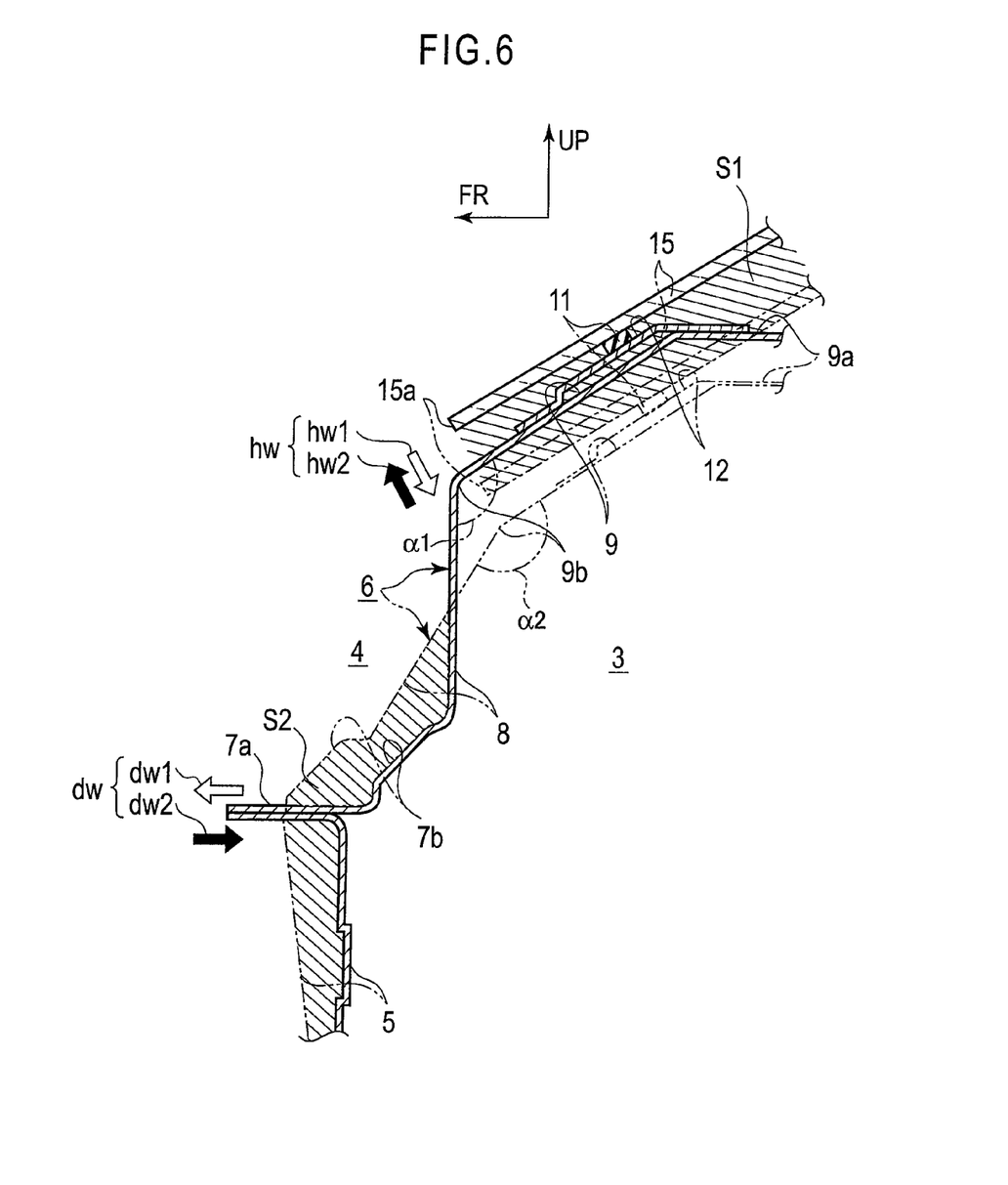
FIG. 6 is a cross-sectional view schematically showing a state where in the vehicle body structure of FIG. 1, a vertical wall surface portion of the air box vibrates in an opposite phase to glass membrane vibrations of a front windshield glass in surface inward-outward directions.

For this reason, as shown by a hollow arrow in FIG. 6, when glass membrane vibrations of the glass 15 in surface inward-outward directions hw are in the phase shifting in an inward direction hw1 to the passenger compartment 3, the vertical wall surface portion 8 of the air box 4 shifts in an outward direction dw1 from the passenger compartment 3, as shown by a hollow arrow in FIG. 6.

Additionally, as shown by an arrow in FIG. 6, when glass membrane vibrations of the glass 15 in the surface inward-outward directions hw are in the phase shifting in an outward direction hw2 from the passenger compartment 3, the vertical wall surface portion 8 of the air box 4 shifts in an inward direction dw2 to the passenger compartment 3, as shown by an arrow in FIG. 6. In other words, the vertical wall surface portion 8 is configured to vibrate in the opposite phase to the glass 15, in a case of glass membrane vibrations in any direction.

Furthermore, in the vehicle body structure of an automobile according to the embodiment, the dash lower panel member 5 is configured to shift in the opposite phase to the glass 15 in the outward and inward directions dw1, dw2 from and to the passenger compartment 3, along with the shifting of the vertical wall surface portion 8 in the opposite phase to the glass 15.

Next, operations and effects of the vehicle body structure of an automobile according to the embodiment will be described.

In the embodiment, as shown in FIG. 1, the back surface side of the glass 15 near the front edge portion 15a is supported, by means of the seal member 11 attached to the upper surface 12a of the cowl top cover bracket member 12, from below at the position on the vehicle rear side of the vertical wall surface portion 8 of the dash upper panel member 6.

As described above, the front edge portion 15a of the glass 15 is connected to the upper inclined bearing surface portion 9 at the position on the vehicle rear side of the air box 4. Thereby, when glass membrane vibrations of the glass 15 in the surface inward-outward directions hw are in such a phase that the glass 15 shifts in the inward direction hw1 to the passenger compartment 3 as shown by the hollow arrow in FIG. 6, deformation is generated in which a bending angle α1 of the corner portion 9b is caused to be a bending angle α2 larger than the bending angle α1, as shown by a chain double-dashed line in FIG. 6. Thus, a lower portion of the vertical wall surface portion 8 of the air box 4 and an upper portion of the dash lower panel member 5 shift in the outward direction dw1 from the passenger compartment 3, as shown by the hollow arrow in FIG. 6.

In addition, when glass membrane vibrations of the glass 15 in the surface inward-outward directions hw are in such a phase that the glass 15 is shifting in the outward direction hw2 from the passenger compartment 3 as shown by the arrow in FIG. 6, the bending angle α2 of the corner portion 9b changes to the bending angle α1, as shown by a solid line in FIG. 6. For this reason, a lower portion of the vertical wall surface portion 8 of the air box 4 and an upper portion of the dash lower panel member 5 shift in the inward direction dw2 to the passenger compartment 3, as shown by the arrow in FIG. 6.

In the vehicle body structure of an automobile according to the embodiment, the dash lower panel member 5 shifts in the opposite phase to the glass 15 in outward and inward directions dw1, dw2 from and to the passenger compartment 3, along with the shifting of the vertical wall surface portion 8 in the opposite phase to the glass 15.

For this reason, in the vehicle body structure of an automobile according to the embodiment, when glass membrane vibrations of the glass 15 in the surface inward-outward directions hw occur, an amount of reduction (or an amount of increase) in capacity (volume of an inner space of the passenger compartment 3) of the passenger compartment 3 shown by a region S1 in FIG. 6 and an amount of increase (or an amount of reduction) in capacity of the passenger compartment 3 shown by a region S2 in FIG. 6 are balanced. Accordingly, it is possible to reduce capacity changes in the entire passenger compartment 3, which are caused by glass membrane vibrations.

Hence, unlike the conventional technique, it is no longer necessary to increase the supporting rigidity by, for example, increasing a plate thickness of a portion for supporting the glass 15 for the purpose of suppressing the vibrations of the glass 15. Hence, it is possible to improve a noise vibration performance by reducing muffled sound while suppressing increase in weight.

Moreover, in the vehicle body structure of an automobile according to the embodiment, the dash lower panel member 5 shifts in the opposite phase to the glass 15 in the inward-outward directions dw to and from the passenger compartment 3, together with the vertical wall surface portion 8.

For this reason, even when the shifting amount in the inward-outward directions dw to and from the passenger compartment 3 in the vertical wall surface portion 8 of the air box 4 is small, increase (or reduction) in capacity of the passenger compartment 3 which compensates reduction (or increase) in capacity of the passenger compartment 3 caused by shifting of the glass 15 can be secured easily (in FIG. 6, to obtain S2 which has substantially the same area as S1, and which changes in the opposite phase to S1). Thus, capacity changes in the entire passenger compartment 3 at the time of glass membrane vibrations can be suppressed reliably.

Additionally, in the vehicle body structure of an automobile according to the embodiment, the glass 15 is supported from below by means of the seal member 11 which is located on the upper surface of the upper inclined bearing surface portion 9, on the vehicle rear side of the vertical wall surface portion 8 and which is attached to the upper surface 12a of the cowl top cover bracket member 12.

Accordingly, it is possible to form the glass fitting portion 14d at the rear edge portion of the cowl top cover member 14 covering the upper surface of the air box 4, and to set the front edge portion 15a of the glass 15, fitted to the glass fitting portion 14d, at the position on the vehicle rear side of the position of cross section of the air box 4, as shown in FIG. 1.

Hence, the surface area of the cowl top cover member 14 can be set large, and a large number of the ventilation holes 14c . . . can be formed in the outside-air introduction surface portion 14b.

Accordingly, a large amount of air-conditioning air can be introduced into the air box 4 from the outside of the vehicle, and thus a fuel consumption performance can be further enhanced by improving the efficiency of air-conditioning equipment.

Although the embodiment of the present invention has been described above, the embodiment is only an example described for facilitating the understanding of the present invention, and the present invention is not limited to the embodiment. The technical scope of the present invention is not limited to the specific technical matters disclosed in the above embodiment, but includes various modifications, changes, alternative techniques and the like which can be easily derived from the embodiment.

For example, in the above embodiment, a description has been given of an example in which the back surface side of the glass 15 near the front edge portion 15a is supported, by means of the seal member 11 attached to the upper surface 12a of the cowl top cover bracket member 12, from below. However, the supporting structure of the glass 15 is not particularly limited thereto, and may be a structure in which the seal member 11 is not provided on the cowl top cover bracket member 12 and the back surface side of the glass 15 near the front edge portion 15a is supported, by means of the seal member 11 attached directly to the upper inclined bearing surface portion 9, from below. The supporting structure of the glass 15 only needs to be a structure configured such that the vertical wall surface portion 8 vibrates in the opposite phase to the directions of glass membrane vibrations, and the shape and material of the supporting portion to be connected to the front edge portion 15a of the glass 15 are not particularly limited.

Additionally, in the above embodiment, a description has been given of an example of such a vehicle that the engine as the driving source is housed in the engine room 2, and the air box 4 is arranged in the rear of the engine room 2 and in the front of the passenger compartment 3. However, a vehicle to which the vehicle body structure of an automobile according to the present invention is to be employed is not particularly limited thereto, and may be any automobile as long as the automobile includes the vertical wall surface portion 8 facing the passenger compartment 3 such as: an electric vehicle having a motor, a battery, an electronic control device or the like in the engine room 2 in the front portion of vehicle; or a hybrid vehicle having multiple driving sources such as an engine and a motor.

The present application claims priority based on Japanese Patent Application No. 2010-108913 filed on May 11, 2010, the entire content of which is incorporated herein by reference.

INDUSTRIAL APPLICABILITY

According to the present invention, the vertical wall surface portion of the air box can vibrate in the opposite phase to glass membrane vibrations of the front windshield glass in the surface inward-outward directions. Hence, changes in the capacity of the entire vehicle compartment are suppressed, and thus muffled sound can be reduced without increasing the supporting rigidity by, for example, increasing a plate thickness of a member for supporting the glass.

REFERENCE SIGNS LIST 3 passenger compartment (vehicle compartment)
4 air box
8 vertical wall surface portion
15 front windshield glass (glass)
15a front edge portion

The invention claimed is:

1. A vehicle body structure of an automobile comprising:
a front windshield glass;
an air box supporting a front edge portion of the glass and including a vertical wall surface portion facing an inner side of a vehicle compartment; and
a dash lower panel member connected to the vertical wall surface portion of the air box,
wherein the front edge portion of the glass is connected to the air box in such a way that when glass membrane vibrations of the glass in surface inward-outward directions are in a phase shifting in an inward direction to the vehicle compartment, the vertical wall surface portion of the air box and the dash lower panel member shift in an outward direction from the vehicle compartment, and when the glass membrane vibrations of the glass in the surface inward-outward directions are in a phase shifting in an outward direction from the vehicle compartment, the vertical wall surface portion of the air box and the dash lower panel member shift in an inward direction to the vehicle compartment.

2. The vehicle body structure of an automobile according to claim 1, wherein the front edge portion of the glass is supported at a position on a vehicle rear side of the vertical wall surface portion of the air box.

3. The vehicle body structure of an automobile according to claim 1, wherein the dash lower panel member is connected to the vertical wall surface portion of the air box to be substantially flush with the vertical wall surface portion.

* * * * *